United States Patent [19]
Kawai

[11] Patent Number: 4,977,445
[45] Date of Patent: Dec. 11, 1990

[54] SYNC-SIGNAL REPRODUCING CIRCUIT FOR USE IN TELEVISION RECEIVER

[75] Inventor: Kiyoyuki Kawai, Yokosuka, Japan

[73] Assignee: Kabushiki Kaisha Toshiba, Kawasaki, Japan

[21] Appl. No.: 337,473

[22] Filed: Apr. 13, 1989

[30] Foreign Application Priority Data

May 9, 1988 [JP] Japan .................. 63-112270

[51] Int. Cl.⁵ .................. H04N 5/04; H04N 5/06
[52] U.S. Cl. .................. 358/17; 358/19; 358/148; 358/150
[58] Field of Search .................. 358/17, 19, 148, 150, 358/154, 153, 158

[56] References Cited

U.S. PATENT DOCUMENTS 4,660,074  4/1987  Schine .................. 358/17
4,769,704  9/1988  Hirai et al. .................. 358/148

FOREIGN PATENT DOCUMENTS 278277  12/1986  Japan .
61-283276  12/1986  Japan .

Primary Examiner—Tommy P. Chin
Attorney, Agent, or Firm—Oblon, Spivak, McClelland, Maier & Neustadt

[57] ABSTRACT

A color subcarrier reproducing circuit reproduces a color subcarrier on the basis of a color burst signal in a color television signal in which phase reference data synchronized with the color burst signal is inserted in a predetermined position in a vertical blanking period, and provides a first clock signal whose frequency is equal to the frequency of the color subcarrier and a second clock signal whose frequency is four times the subcarrier frequency. The second clock signal is frequency-divided by first and second frequency dividers to produce a reproduced horizontal sync signal, and frequency-divided by first and third frequency dividers to produce a reproduced vertical sync signal. A phase reference data reproducing circuit reproduces the phase reference data from the color television signal using the first clock signal as a sampling signal. On detecting that the phase reference data reproduced by the phase reference data reproducing circuit has a predetermined pattern, a pattern detecting circuit resets the first to third frequency dividers, thereby keeping the phases of the horizontal and vertical sync signals in sync with the phase reference data.

14 Claims, 5 Drawing Sheets

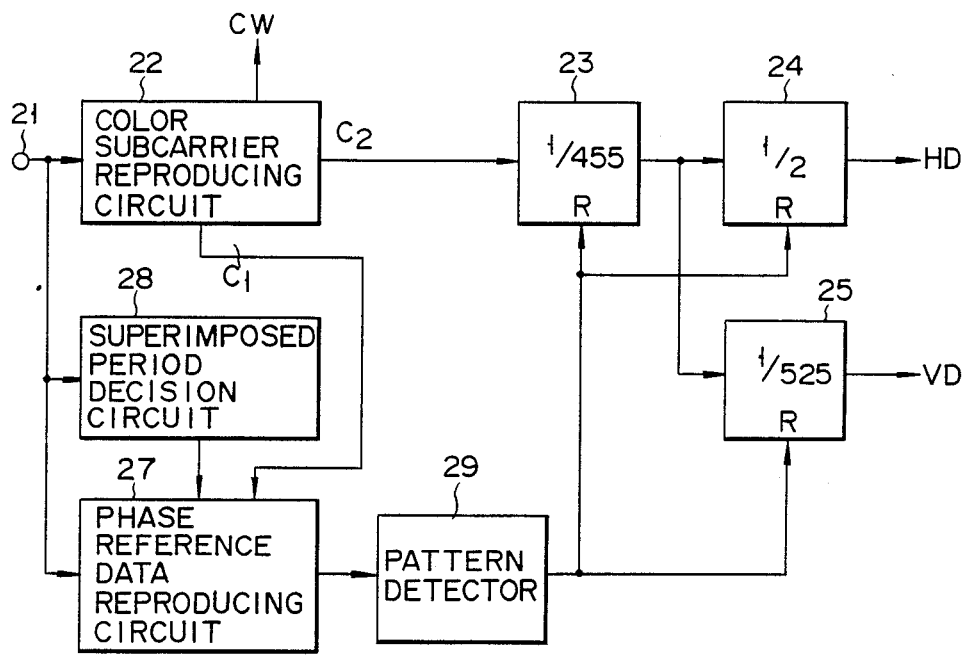
F I G. 1
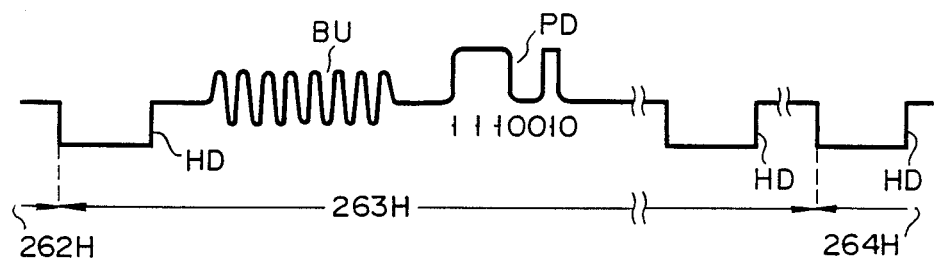
F I G. 2A
F I G. 2B
F I G. 2C

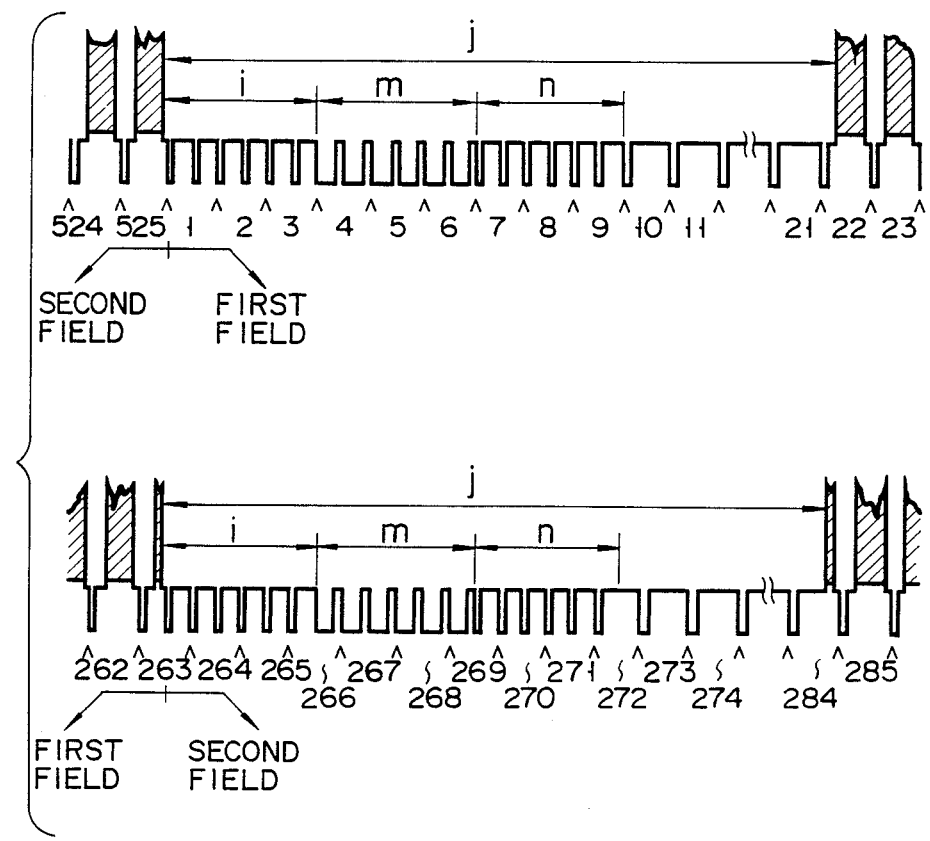
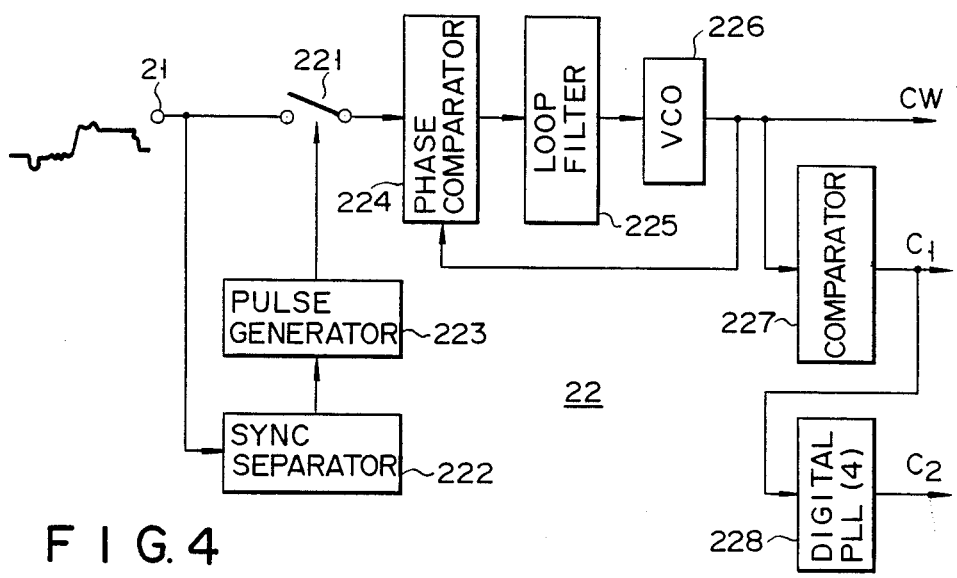
FIG. 3
FIG. 4

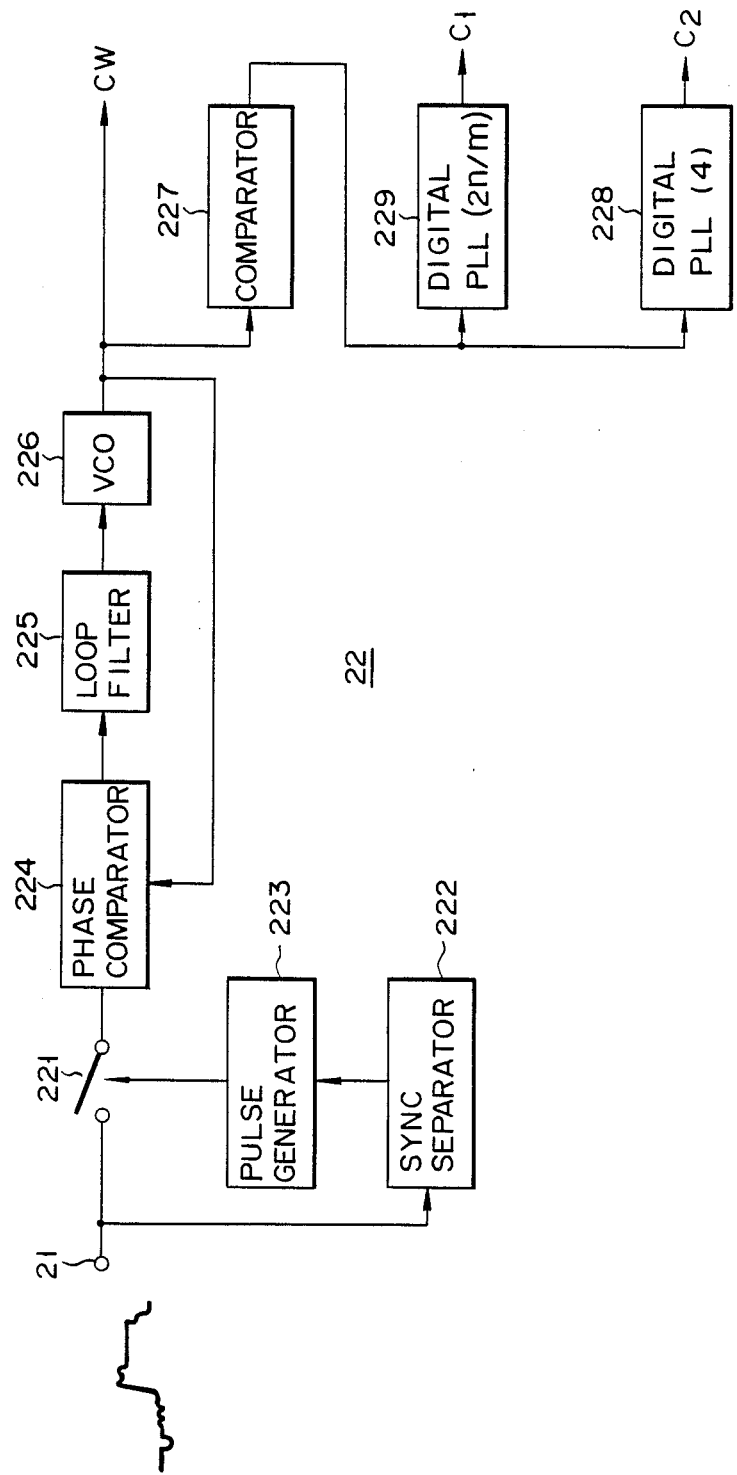
F I G. 11

SYNC-SIGNAL REPRODUCING CIRCUIT FOR USE IN TELEVISION RECEIVER

BACKGROUND OF THE INVENTION

1. Field of the Invention

The present invention relates to a synchronizing signal reproducing circuit for use in a television receiver.

2. Description of the Related Art

A color television receiver is provided with a sync-signal reproducing circuit adapted to reproduce sync signals (horizontal sync signals HD and vertical sync signals VD) contained in a received color television signal. The sync-signal reproducing circuit is comprised of a sync separator, a phase comparator, a loop filter, and a voltage-controlled oscillator (VCO). That is, in the sync-signal reproducing circuit, the color television signal is applied to the sync separator for separating the horizontal sync signal HD. The separated horizontal sync signal HD is applied to the phase comparator for comparison with an output signal of the VCO. An output signal of the phase comparator representing the result of the comparison is fed back to the VCO as a control signal. As a result of this, the VCO is controlled in oscillation frequency to provide an output signal synchronized with the separated horizontal sync signal HD from the sync separator. The output signal of the VCO is applied to the phase comparator as a comparison signal. The output signal of the VCO is used as the reproduced horizontal sync signal HD and is further subjected to suitable frequency division to reproduce the vertical sync signal VD.

The phase comparator, loop filter, and VCO form a phase-locked loop (PLL). The use of the PLL is to stabilize the phases of the reproduced sync signals HD and VD. Generally, the sync separator separates the horizontal sync signal HD by slicing the peak portion thereof. Thus, the separated output often contains impulse noise. Where the reproduced sync signals HD and VD are obtained directly from the separated output, therefore, they will be degraded in quality, failing to provide stable synchronous operation for picture display. The PLL is thus used to exclude the influence of the impulse noise upon picture display. More specifically, the PLL controls the oscillation frequency of the VCO so as to keep the center of a separated horizontal sync pulse and the rising edge of an output pulse of the VCO in time coincidence. That is, the PLL operates in such a way that the direct-current component in the output of the phase comparator becomes zero. As described above, in order for the conventional sync-signal reproducing circuit to lessen the influence of the impulse noise by use of the flywheel effect of the PLL, use is made of, as the phase comparator, a circuit having a function to convert the phase difference to a direct-current component of an analog representation.

However, the conventional sync-signal reproducing circuit has a problem in that the phases of reproduced sync signals HD and VD cannot be kept in sync with those of incoming sync signals HD and VD if ghost signals or multipath signals are superimposed on a color television signal. That is, where the ghost signals are superimposed on the color television signal, the horizontal sync signal HD contained in the color television signal will be varied in waveform. This will cause the sync separator to produce a horizontal sync signal HD which is narrower in width than the inherent horizontal sync signal HD. However, since the PLL circuit, as described above, controls the oscillation frequency of the VCO so that the rising edge of an output pulse of the VCO may be coincident with the center of the pulse width of a separated horizontal sync pulse HD, the rising edge of the output pulse of the VCO will be deviated in phase from the center of the inherent horizontal sync pulse HD. This will cause a phase shift between the reproduced horizontal sync signal HD and the inherent horizontal sync signal HD.

Since usual color television receivers perform the overscanning, some degree of the phase shift of the reproduced horizontal sync signal HD with respect to the inherent horizontal sync signal is not a serious problem on the screen. However, where television pictures are fully displayed on the screen without the overscanning, the above phase shift will considerably degrade the quality of the television pictures. Particularly, in a television system in which side picture information is transmitted simultaneously with the present television pictures (the 4:3 aspect ratio) by means of multiplexing or separate channels so as to reproduce wide pictures (the 16:9 aspect ratio), accurate sync reproduction is required in television receivers. That is, the 4:3 picture and the side pictures are combined to reproduce a wide picture. In this case, the positions at which the pictures are to be linked must be determined by reference to sync signals. In a case where the accuracy of the reproduction of the sync signals is inadequate in a receiver, therefore, the pictures will be combined at positions different from the inherent positions determined in the transmitter. In such a case, a considerably unnatural wide picture will result.

In the conventional sync-signal reproduction circuit, as described above, there is a problem that the displayed pictures are considerably degraded in quality where no overscanning is performed because of the shift of the reproduced sync signal in phase from the inherent phase thereof resulting from inaccurate separation of the incoming horizontal sync signal under the interference by ghost signals.

SUMMARY OF THE INVENTION

It is accordingly an object of the present invention to provide a sync-signal reproducing circuit which permits accurate reproduction of sync signals even under the influence of ghost signals and prevention of the degradation of picture quality where no overscanning is performed.

According to the present invention, there is provided a sync-signal reproduction circuit for obtaining sync signals from a color television signal, the sync-signal reproduction circuit comprising receiving means for receiving the color television signal, tee color television signal containing phase reference data synchronized with a color burst signal in a predetermined position in a vertical blanking interval, color subcarrier reproducing means for reproducing a color subcarrier in accordance with the color burst signal in the color television signal received at the receiving means, sync signal generating means, responsive to a reproduced output of the color subcarrier reproducing means, for generating sync signals, phase reference data reproducing means, responsive to the color television signal received at the receiving means and a reproduced output of the color subcarrier reproducing means, for reproducing the phase reference data from the color television signal, and synchronizing means, responsive to a reproduced output of the phase reference data reproducing means, for controlling the sync signal generating means to keep the phases of the sync signals output from the sync signal generating means in sync with the phase reference data.

BRIEF DESCRIPTION OF THE DRAWINGS

FIG. 1 is a block diagram of a sync-signal reproducing circuit according to an embodiment of the present invention;

FIGS. 2A to 2C show signal waveforms used for explaining the operation of the circuit of FIG. 1, more specifically, FIG. 2A showing an NTSC color television signal in the 263-th horizontal scanning period, FIG. 2B showing an output signal of the superimposed period decision circuit of FIG. 1, and FIG. 2C showing an output pulse of the pattern detector of FIG. 1;

FIG. 3 shows a general NTSC television signal;

FIG. 4 shows a practical arrangement of the color subcarrier reproducing circuit of FIG. 1;

FIG. 11 is a block diagram of a color subcarrier reproducing circuit in a third embodiment of the invention.

DETAILED DESCRIPTION OF THE PREFERRED EMBODIMENTS

Figure 5A:
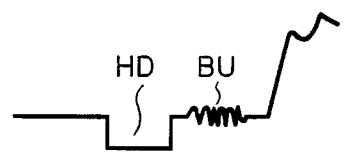
FIGS. 5A to 5C and FIGS. 6A to 6C show signal waveforms used for explaining the operation of the circuit of FIG. 4, more specifically, FIG. 5A showing a color television signal, FIG. 5B showing a horizontal sync signal from the sync sepator, FIG. 5C showing a burst gate pulse from the pulse generator, FIG. 6A showing a color subcarrier, FIG. 6B showing a clock signal $C_1$, and FIG. 6C showing a clock signal $C_2$.

Referring now to FIG. 1, an input terminal 21 is supplied with an NTSC color television signal which contains phase reference data PD representing the phase reference of reproduced sync signals HD and VD in a predetermined position in a vertical blanking period. The clock phase of the phase reference data PD is in sync with a color burst signal BU. That is, the phase reference data PD is in phase with the color burst signal BU or has a predetermined phase difference with respect to the color burst signal BU. For the following description, it is assumed that the clock phase of the phase reference data PD has the same phase as the color burst signal BU.

The color television signal applied to input terminal 21 is applied to a color subcarrier reproducing circuit 22 so that the color subcarrier CW having a frequency of $f_{SC}$ is reproduced in synchronization with color burst signal BU. Color subcarrier reproducing circuit 22 further binary-codes the reproduced color subcarrier CW to produce a clock signal $C_1$ of a frequency of $f_{SC}$ and quadruples the frequency of clock signal $C_1$ to produce a clock signal $C_2$ of a frequency of $4f_{SC}$. Namely, in this embodiment, use is made of $f_{SC}$ as the frequency $f_{CK}$ of clock signal $C_1$.

The frequency $4f_{SC}$ of clock signal $C_2$ is divided by 455 by a frequency divider 23 and then divided by two by a frequency divider 24. The divided output signal of frequency divider 23 is further divided by 525 by a frequency divider 25. Here the color subcarrier frequency $f_{SC}$, the frequency $f_H$ of the horizontal sync signal and the frequency $f_V$ of the vertical sync signal are related as follows:

$$f_{SC} = (455/2)f_H,$$

$$f_H = (525/2)f_V.$$

Thus frequency divider 24 produces a signal of a frequency of $f_H$ which is used as the reproduced horizontal sync signal HD. Frequency divider 25 produces a signal of $f_V$ which is used as the reproduced vertical sync signal VD.

The color television signal applied to input terminal 21 is further applied to a phase reference data reproducing circuit 27, which reproduces the phase reference data PD contained in the color television signal in response to the clock signal $C_1$. The phase reference data PD is NRZ-type digital data having a data rate of $f_{SC}$, for example. As such phase reference data PD, use may be made of data whose autocorrelation function has a sharp peak as data of the Baker series, for example, "1110010".

In FIG. 2A, there is shown a color television signal containing such phase reference data PD as described above. The phase reference data PD is superimposed on a predetermined horizontal scanning period in the vertical blanking period. The superimposed position may be set at a position which is a predetermined number of clocks ($f_{CK} = f_{SC}$) of the clock signal $C_1$ away from the trailing edge of the horizontal sync pulse HD. The predetermined horizontal scanning period may be the 263-th horizontal scanning period (263H). In the NTSC television signal, as shown in FIG. 3, the 263H contains a video signal only during a first half period thereof. This video siqnal is not necessarily required. Thus, in the present embodiment, the phase reference data PD is superimposed instead of the video signal. It is to be noted that the color burst signal is omitted in FIG. 3 for the sake of simplification.

The phase reference data PD is first binary-coded by a phase reference data reproducing circuit 27. The binary-coded output is sampled with the clock signal $C_1$ of the frequency $f_{SC}$ output from color subcarrier reproducing circuit 22. As a result, the phase reference data PD is reproduced discretely. In this case, the clock phase of the phase reference data PD and the clock signal $C_1$ output from color subcarrier reproducing circuit 22 are each synchronized with the color burst signal BU. Hence the sampling of the color television signal with the clock signal $C_1$ will surely reproduce the phase reference data PD.

The reproduced output of phase reference data reproducing circuit 27 is made effective only for the superimposed period of the phase reference data PD. The superimposed period is decided by a superimposed period decision circuit 28, which includes a conventional sync-signal reproducing circuit comprised of a sync separator and a phase-locaked loop (PLL) circuit, as described in the "Background of the Invention" in the specification Superimposed period decision circuit 28 reproduces the horizontal sync signal HD and the vertical sync signal VD from the input signal and decides the superimposed period of the phase reference data PD on the basis of the reproduced sync signals HD and VD. A superimposed period decision signal $S_d$ output from superimposed period decision circuit 28 is shown in FIG. 2B.

The reason why the superimposed period of the phase reference data PD can be decided on the basis of the reproduced sync signals HD and VD is that the superimposed position of the phase reference signal PD is determined previously as described above. Since the phase shift of the reproduced sync signals HD and VD occurs under the ghost interference as described above, the superimposed period decision signal $S_d$ will also be phase-shifted due to the ghost interference. However, since superimposed period decision circuit 28 is arranged to decide a relatively long period covering more than the actual superimposed period of the phase reference data PD, no problem will arise from a little phase shift of the superimposed-period decision signal $S_d$.

The reproduced output of phase reference data reproducing circuit 27 is applied to pattern detector 29 to detect whether phase reference data PD has a specific pattern previously stored, e.g. "1110010" pattern as described above. When detecting this pattern, pattern detector 29 provides such a detect pulse $P_d$ as shown in FIG. 2C. The detect pulse $P_d$ is applied to frequency dividers 23, 24, and 25 to forcibly reset them. Frequency dividers 23, 24, and 25 are thus reset at the time position for superimposing phase reference signal PD, so that reproduced horizontal sync signal HD output from frequency divider 24 and reproduced vertical sync signal VD output from frequency divider 25 are synchronized with phase reference data PD.

Figure 5B:
Figure 5C:

FIG. 4 shows a practical arrangement of color subcarrier reproducing circuit 22. As shown, the color television signal applied to input terminal 21 is applied to a switch 221 and a sync separator 222. Sync separator 222 separates horizontal sync signal HD from the color television signal of FIG. 5A as shown in FIG. 5B. The separated sync signal is applied to a pulse generator 223 to produce a burst gate pulse GP shown in FIG. 5C. The burst gate pulse GP turns on switch 221, so that a color burst signal BU contained in the color television signal is applied as a reference signal to a PLL circuit comprised of a phase comparator 224, a loop filter 225, and a voltage-controlled oscillator (VCO) 226. Consequently, color subcarrier CW of a frequency of $f_{SC}$ synchronized with color burst signal BU is obtained. The color subcarrier CW is accurately synchronized with color burst signal BU even under the ghost interference.

Figure 6A:
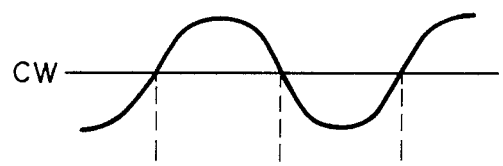
Figure 6B:

The color subcarrier CW is applied to a comparator 227 and binary coded with a zero-cross point as the reference level, thereby providing the clock signal $C_1$ of frequency $f_{SC}$. FIG. 6A shows color subcarrier CW and FIG. 6B shows clock signal $C_1$ as the binary-coded output of CW. The clock signal $C_1$ is obtained with an accuracy of the order of nanoseconds.

Figure 6C:

The clock signal $C_1$ is quadrupled in frequency by a digital PLL 228 to produce the clock signal $C_2$ of a frequency of $4f_{SC}$ shown in FIG. 6C.

As represented by $f_{SC}=(455/2)\times(525/2)$ $f_V$, the phase of the color subcarrier recurs in four fields, i.e., two frames. Therefore, phase reference data PD is superimposed during one vertical banking period in two frames, for example, to correct the phases of the reproduced horizontal and vertical sync signals HD and VD.

Figure 7:
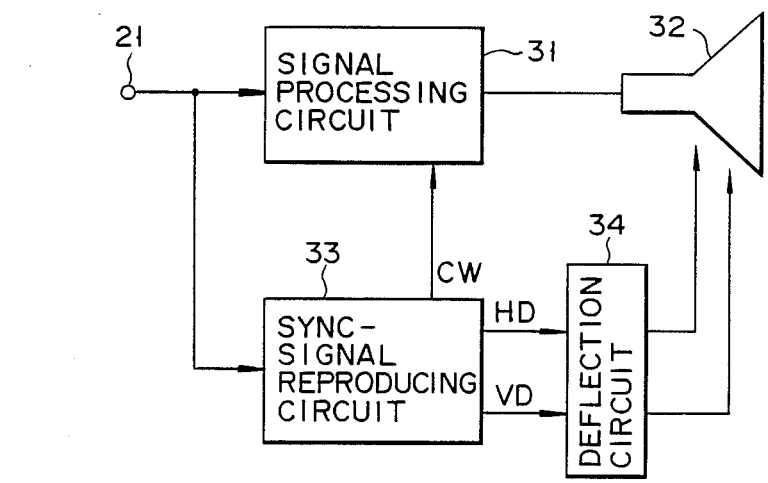
FIG. 7 is a schematic circuit diagram of a color television receiver using the sync signal reproducing circuit of the invention.

In FIG. 7, there is shown a schematic arrangement of a television receiver using the sync-signal reproducing circuit of the present invention. The color television signal applied to input terminal 21 is applied to a signal processing circuit 31 to be subjected to signal processing, such as color demodulation, and then supplied as a video signal to a color cathode ray tube 32 for displaying color pictures. In this case, color subcarrier CW output from sync-signal reproducing circuit 33 is applied to signal processing circuit 31 to be used as a carrier for color demodulation. The reproduced sync signals HD and VD are applied to a deflection circuit 34, which produces sawtooth horizontal and vertical deflection signals for application to cathode-ray tube 32 in response to reproduced horizontal and vertical sync signals HD and VD. As a result, the horizontal and vertical scanning of an electron beam is performed. Since the deflection signals are obtained on the basis of the reproduced sync signals VD and HD which are highly accurate in phase and frequency, the edges of the television pictures will not be cropped even when overscanning is not performed.

The embodiment, as described above, is arranged to reproduce the color subcarrier in synchronization with color burst signal BU, produce sync signals HD and VD in accordance with the reproduced subcarrier, reproduce phase reference data PD transmitted in synchronization with color burst signal BU while being superimposed in a predetermined position in a vertical blanking period, and synchronize the reproduced sync signals HD and VD with the reproduced phase reference data PD.

According to such an arrangement, there are the following advantages.

(1) Sync signals HD and VD of predetermined phases can be reproduced even under the ghost interference.

This is because phase reference data PD used as the phase reference for reproduced sync signals HD and VD is transmitted in synchronization with color burst signal BU and reproduced in accordance with the color subcarrier which can stably be reproduced even under the ghost interference. Incidentally, the color subcarrier can be reproduced with a precision of nanoseconds or below under normal receiving conditions.

(2) Reproduced sync signals HD and VD which are very stable in frequency can be obtained.

This is because the reproduced sync signals HD, VD are reproduced on the basis of the stably reproducable color subcarrier.

According to the above embodiment, the frequency $f_{CK}$ of clock signal $C_1$ is set at the color subcarrier frequency $f_{SC}$, which, as described above, is related to the horizontal scanning frequency $f_H$ as follows:

$$f_{SC}=(455/2)f_H.$$

The color subcarrier thus reverses in polarity between successive frames. With the above embodiment, therefore, the digital data is superimposed during vertical blanking period once in two frames so that phase reference data PD may have a fixed phase with respect to each of the horizontal and vertical sync signals. In the receiver side, since the sync reproduction is performed with reference to the stable frequency $f_{SC}$, the phase reference data transmitted every two frames suffices for adequate operations.

In order to realize more stable operation, however, the phase reference data may be transmitted every frame with some additions.

Figure 8:
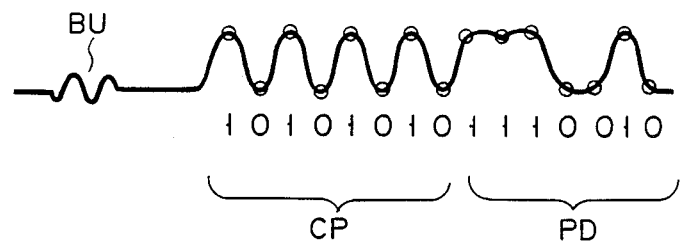
FIG. 8 shows a color television signal used in a second embodiment of the invention.
Figure 9:
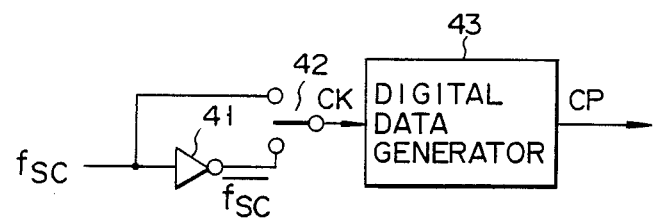
FIG. 9 shows a circuit for reversing the phase of a color subcarrier every frame.

That is, in the transmitter side, a pattern of alternate "1" and "0" is transmitted as digital clock phase data CP prior to the phase reference data PD as shown in FIG. 8. More specifically, in the transmitter side, as shown in FIG. 9, a signal of a frequency of $f_{SC}$ and the inverted version thereof ($\overline{f_{SC}}$) through an inverter 41 are switched by a switch 42 every frame for application to a digital data generator 43 as clock signal CK therefor. Digital data generator 43 generates the clock phase data CP in response to the clock signal CK applied thereto.

Figure 10:
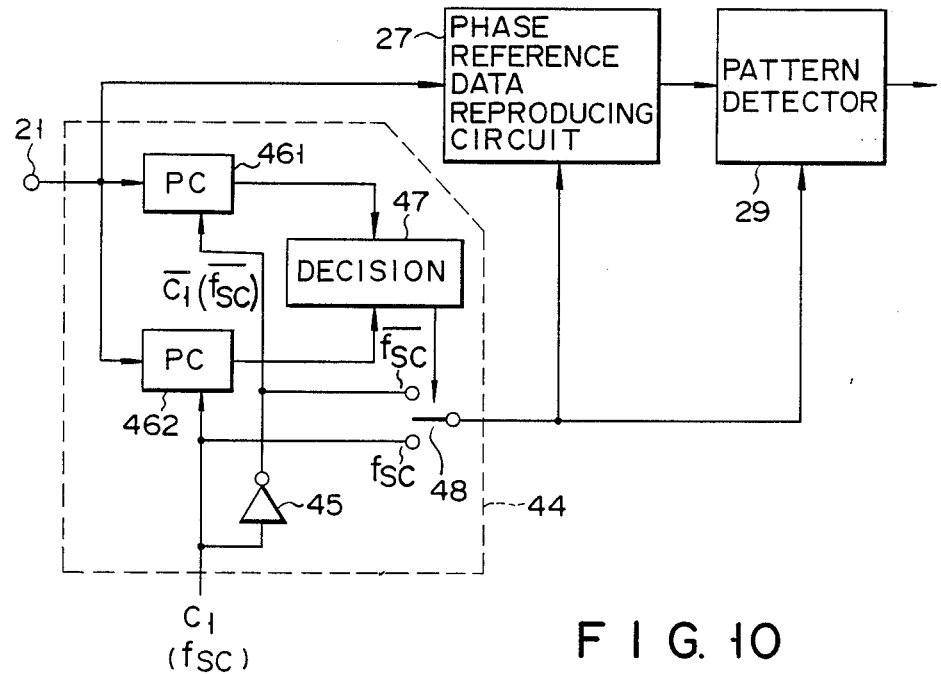
FIG. 10 is a block diagram of the second embodiment of the invention.

In the receiver side, on the other hand, a clock phase decision circuit 44 is added to the circuit of FIG. 1 as shown in FIG. 10. That is, in clock phase decision circuit 44, the inverted version ($\overline{C_1}$) of clock signal $C_1$ of frequency $f_{SC}$ from color subcarrier reproducing circuit 22 through an inverter 45 is compared by a phase comparator (PC) 461 with clock phase data CP in the received color television signal. Clock signal $C_1$ and clock phase data CP are compared by a phase comparator (PC) 462. A decision circuit 47 decides the clock phase of the transmitted data on the basis of the comparison results of comparators 461 and 462 and switches by a switch 48 between the noninverted clock signal $C_1$ of frequency $f_{SC}$ and the inverted clock signal $\overline{C_1}$ of frequency $\overline{f_{SC}}$ for application to phase reference data reproducing circuit 27 and pattern detector 28.

The reason why a pattern of "1", "0" is inserted, as the clock phase data CP, before the phase reference data PD is that the degree of freedom of selection of the clock frequency increases.

The data rate of phase reference data PD, i.e., the frequency $f_{CK}$ of clock signal $C_1$ is not limited to color subcarrier frequency $f_{SC}$. It is only required that $f_{SC}$ be an integral multiple of horizontal scanning frequency $f_H$ and a rational number multiple of color subcarrier frequency $f_{SC}$. For instance, in the case of character-multiplexing (teletext) broadcasting presently put to practical use, a data rate of $f_{CK}=(8/5)f_{SC}=364f_H$ is used. Of course this data rate may be used in the present invention. Other data rates, such as $f_{CK}=(2 \times i/5)f_{SC}$ (i=an integer from 1 to 4), $f_{CK}=(2 j/7)f_{SC}$ (j=an integer from 1 to 8), and $f_{CK}=(2 k/13)f_{SC}$ (k=an integer from 1 to 15), may also be used.

So long as phase reference data PD, as described above, has a data rate which is an integral multiple of horizontal scanning frequency $f_H$ and a rational-number multiple of color subcarrier frequency $f_{SC}$, sync signals HD and VD can be obtained by appropriately setting the dividing factors of frequency dividers 23, 24, and 25 shown in FIG. 1.

With such a data rate, the frequency $f_{CK}$ of clock signal $C_1$ becomes an integral multiple of the horizontal scanning frequency $f_H$ and hence the clock signal always has a predetermined phase relationship with respect to the horizontal sync signal on any line. Therefore, where the phase reference data PD is superimposed on the 263H, the pattern signal can be superimposed every frame in a predetermined phase relationship, without switching between $f_{SC}$ and $\overline{f_{SC}}$ as in the second embodiment.

It is particularly preferable to use $f_{CK}=(2 n/m)f_{SC}$ as the data rate of the phase reference data PD, where n=natural numbers and m=5, 7, or 13. When such a data rate is used, as shown in FIG. 11, the output frequency $f_{SC}$ of comparator 227 multiplied by a factor of 2 n/m by means of a digital PLL circuit 229 to produce clock signal $C_1$ of a frequency of $(2 n/m)f_{SC}$ and quadrupled by digital PLL circuit 228 to produce clock signal $C_2$ of a frequency of $4f_{SC}$.

Although the preferred embodiments of the present invention have been disclosed and described, it is apparent that other embodiments and modification are possible.

According to the present invention, as described above, since sync signals can be reproduced which always have predetermined phases, even under the ghost interference, the degradation of picture quality can be avoided in displaying full pictures without performing overscanning.

What is claimed is:

1. A sync-signal reproducing circuit for obtaining sync signals from a color television signal, said sync-signal reproducing circuit comprising:

receiving means for receiving the color television signal, the color television signal containing phase reference data synchronized with a color burst signal in a predetermined position in a vertical blanking interval, the phase reference data being digital data having a predetermined pattern;

color subcarrier reproducing means for reproducing a color subcarrier in accordance with the color burst signal in the color television signal received at said receiving means and outputting a reproduced signal;

sync signal generating means, responsive to the reproduced signal output from said color subcarrier reproducing means, for generating sync signals;

phase reference data reproducing means, responsive to the color television signal received at said receiving means and the reproduced signal output from said color subcarrier reproducing means, for reproducing the phase reference data from the color television signal and outputting a reproduced phase reference data; and pattern detector means, responsive to the reproduced reference data output from said reference data reproducing means, for controlling said sync signal generating means to keep the phases of the sync signals output from said sync signal generating means in sync with the reproduced phase reference data when a pattern of the reproduced phase reference data output from said reference data reproducing means has the predetermined pattern, wherein said sync signal generating means include:

first frequency dividing means for dividing the frequency of the reproduced signal output from said color subcarrier reproducing means to generate a horizontal sync signal; and second frequency dividing means for dividing the frequency of the reproduced signal output from said color subcarrier reproducing means to generate a vertical sync signal, and wherein said pattern detector means includes reset signal generating means, responsive to the reproduced phase reference data output from said phase reference data reproducing means, for generating a reset signal adapted to reset said first and second frequency dividing means.

2. The sync-signal reproducing circuit according to claim 1, wherein the phase reference data contained in the color television signal is digital data having the predetermined pattern in the form of NRZ and has a data rate which is an integral multiple of the frequency of the horizontal sync signal and a rational-number multiple of the frequency of the color subcarrier.

3. The sync-signal reproducing circuit according to claim 2, wherein said phase reference data reproducing means includes reproduction means for reproducing the phase reference data by sampling the color television signal during a predetermined period of time at said data rate and outputting the reproduced phase reference data; and said reset signal generating means generates the reset signal when the reproduced phase reference data output from said reproduction means has the predetermined pattern.

4. The sync-signal reproducing circuit according to claim 3, wherein the data rate of the phase reference data contained in the color television signal is twice the frequency of the color subcarrier.

5. The sync-signal reproducing circuit according to claim 4, wherein said color subcarrier reproducing means includes:
    color subcarrier reproducing circuit means for reproducing the color subcarrier from the color television signal;
    first clock signal generating means, responsive to the color subcarrier reproduced by said color subcarrier reproducing circuit means, for generating a clock signal whose frequency is equal to said data rate and supplying it to said reproduction means.

6. The sync-signal reproducing circuit according to claim 5, wherein said color subcarrier reproducing means further includes second clock signal generating means, responsive to the color subcarrier reproduced by said color subcarrier reproducing circuit means, for generating a reproduced clock signal having a predetermined frequency and supplying it to said first and second frequency dividing means.

7. The sync-signal reproducing circuit according to claim 6, wherein,
    said second clock signal generating means generates the reproduced clock signal with a frequency four times the frequency of the color subcarrier;
    said first frequency dividing means includes a first frequency dividing circuit means for dividing the frequency of the reproduced clock signal by a factor of 455, and second frequency dividing circuit means for dividing the output frequency of said first frequency dividing circuit means by a factor of two to generate the horizontal sync signal; and
    said second frequency dividing means includes said first frequency dividing circuit means for dividing the frequency of the reproduced clock signal by a factor of 455, and third frequency dividing circuit means for dividing the output frequency of said first frequency dividing circuit means by a factor of 525 to generate the vertical sync signal.

8. The sync-signal reproducing circuit according to claim 7, wherein said reset signal generating means generates the reset signal when the reproduced phase reference data output from said reproduction means has the predetermined pattern, and supplies it to said first to third frequency dividing circuit means.

9. The sync-signal reproducing circuit according to claim 3, wherein the phase reference data contained in the color television signal is inserted in the 263-th horizontal scanning period of an NTSC color television signal.

10. The sync-signal reproducing circuit according to claim 3, wherein the data rate of the phase reference data contained in the color television signal is the same as the frequency of the color subcarrier.

11. The sync-signal reproducing circuit according to claim 10, wherein the phase reference data contained in the color television signal is inserted in the color television signal once in two frames.

12. The sync-signal reproducing circuit according to claim 10, wherein the phase of the phase reference data contained in the color television signal is shifted by a half period of the color subcarrier every frame; and the color television signal contains clock phase data for reproducing the phase of the phase reference data contained in the color television signal, the clock phase data being inserted in prior to the phase reference data.

13. The sync-signal reproducing circuit according to claim 12, wherein said phase reference data reproducing means further includes phase deciding means for deciding the phase of the phase reference data contained in the color television signal by a comparison in phase between the reproduced signal output from said color subcarrier reproducing means and the clock phase data inserted in the color television signal and supplying either of the reproduced signal and an inverted version thereof to said reproduction means in accordance with a result of a phase decision.

14. The sync-signal reproducing circuit according to claim 13, wherein said phase decision means includes:
    first phase comparator means for making the comparison in phase between the reproduced signal output from said color subcarrier reproducing means and the clock phase data inserted in the color television signal received at said receiving means;
    inverting means for inverting the reproduced signal output from said color subcarrier reproducing means and outputting an inverting output signal;
    second phase comparator means from making a comparison in phase between the inverting output signal from said inverting means and the clock phase data inserted in the color television signal received at said receiving means;
    decision means for deciding the phase of the phase reference data contained in the color television signal on the basis of outputs of said first and second phase comparator means; and
    switch means, responsive to a result of a decision by said decision means, for selectively supplying one of the reproduced signal from said color subcarrier reproducing means and the inverting output signal from said inverting means to said reproduction means.

* * * * *